United States Patent
Umeno

(10) Patent No.: US 9,463,777 B2
(45) Date of Patent: Oct. 11, 2016

(54) WIPER DEVICE AND WIPER MOTOR

(71) Applicant: ASMO CO., LTD., Kosai, Shizuoka-pref. (JP)

(72) Inventor: Takashi Umeno, Kosai (JP)

(73) Assignee: ASMO CO., LTD., Kosai (JP)

( * ) Notice: Subject to any disclaimer, the term of this patent is extended or adjusted under 35 U.S.C. 154(b) by 0 days.

(21) Appl. No.: 14/751,145

(22) Filed: Jun. 26, 2015

(65) Prior Publication Data
US 2015/0375714 A1   Dec. 31, 2015

(30) Foreign Application Priority Data
Jun. 30, 2014   (JP) ................... 2014-135120

(51) Int. Cl.
*B60S 1/08* (2006.01)
*B60S 1/48* (2006.01)

(52) U.S. Cl.
CPC .............. *B60S 1/0896* (2013.01); *B60S 1/486* (2013.01)

(58) Field of Classification Search
None
See application file for complete search history.

(56) References Cited

U.S. PATENT DOCUMENTS

| | | | |
|---|---|---|---|
| 5,998,883 A * | 12/1999 | Yamazaki | B60S 1/08 307/10.1 |
| 2004/0183492 A1 | 9/2004 | Mitsumoto | |
| 2005/0274398 A1* | 12/2005 | Fonville | B60S 1/482 134/34 |
| 2007/0029961 A1* | 2/2007 | Harita | B60S 1/481 318/484 |
| 2008/0229537 A1 | 9/2008 | Harita | |
| 2010/0139025 A1* | 6/2010 | Natsume | B60S 1/0896 15/250.31 |
| 2012/0266404 A1* | 10/2012 | Braun | B60S 1/0814 15/250.12 |
| 2013/0032169 A1* | 2/2013 | Calluiere | B60S 1/482 134/6 |
| 2013/0037627 A1* | 2/2013 | Kikuta | B60S 1/485 239/284.1 |

FOREIGN PATENT DOCUMENTS

| | | |
|---|---|---|
| JP | S57-007739 A | 1/1982 |
| JP | 61-143957 U | 9/1986 |
| JP | 2004-243937 A | 9/2004 |
| JP | 2008-006971 A | 1/2008 |
| JP | 2010-288383 A | 12/2010 |

* cited by examiner

*Primary Examiner* — Shawki S Ismail
*Assistant Examiner* — Muhammad S Islam
(74) *Attorney, Agent, or Firm* — SOLARIS Intellectual Property Group, PLLC

(57) ABSTRACT

A wiper device that includes: a wiper motor that uses a wiper to perform a wiping operation; and a controller that controls the wiper motor such that a wiping operation by the wiper is performed during a first wiping period for a plurality of cycles in a case in which a vehicle speed detected by a vehicle speed detection section is below a specific speed and a washer switch is switched ON to instruct a washer pump to eject washer fluid, and controls the wiper motor such that a wiping operation of a plurality of cycles by the wiper begins by starting during a second wiping period that is longer than the first wiping period in a case in which the vehicle speed detected by the vehicle speed detection section is the specific speed or greater and the washer switch is switched ON.

18 Claims, 10 Drawing Sheets

WIPER DEVICE AND WIPER MOTOR

CROSS-REFERENCE TO RELATED APPLICATION

This application claims priority under 35 USC 119 from Japanese Patent Application No. 2014-135120 filed Jun. 30, 2014, the entire disclosure of which is incorporated by reference herein.

BACKGROUND

1. Field of the Invention

The present disclosure relates to a wiper device, and in particular, relates to a wiper device in which a wiper motor that swings a wiper back and forth includes a controller that controls the wiper motor. The present disclosure further relates to a wiper motor.

2. Related Art

In known wiper devices, a wiper motor is driven coordinated with squirting of washer fluid when a washer switch is switched ON, swinging a wiper back and forth for plural cycles. In such wiper devices, technology is known in which drive of the wiper motor begins after a specific duration has elapsed since squirting the washer fluid, and the washer fluid is sure to have landed on a glass face of a windshield that was previously in a dry state. This suppresses scratching of the glass face accompanying the wiping operation by the wiper.

Japanese Patent Application Laid-Open (JP-A) No. 2010-288283 describes a wiper motor (an electric motor with a speed reduction mechanism) configuring part of a wiper device. The wiper motor described includes a motor body configured including an armature, a speed reduction mechanism that reduces the rotation speed of the armature at a specific speed reduction ratio for transmission to an output shaft, and a control circuit that controls drive of the motor body itself. The control circuit is configured by mounting plural drive devices on a circuit board (control board). The drive devices are a source of noise, and so the drive devices are separated from a connector provided beside a worm wheel placement portion on one side of a worm gear placement portion, so as to be concentrated on the other side of the worm gear placement portion.

When the wiper swings back and forth coordinated with squirting of the washer fluid, the washer fluid landing on the glass face of the windshield is subject to centrifugal force in a direction away from the center of swing of the wiper, namely in a direction heading out of a wiping range of the wiper, accompanying the wiping operation of the wiper swinging back and forth. The centrifugal force acting on the washer fluid changes according to the wiping speed of the wiper, with the centrifugal force acting on the washer fluid increasing as the wiping speed of the wiper increases. In configurations provided with a link mechanism between the wiper motor and a wiper arm, properties of the link mechanism mean that the wiping speed of the wiper is at its greatest in the vicinity of the center between upper and lower return positions, even if the wiper motor maintains the same rotation speed.

When the vehicle is travelling, washer fluid that has landed on the glass face of the windshield is subject to a force in a direction toward an upper end portion of the windshield, due to an airflow caused by passing air. The force acting on the washer fluid from the airflow of the passing air changes according to the vehicle speed, with the force acting on the washer fluid from the airflow of the passing air increasing as the speed of the airflow caused by passing air increases with higher vehicle speed.

There is therefore an issue in that in cases in which the washer switch is switched ON when the vehicle is travelling at high speed, the amount of the washer fluid landing on the glass face of the windshield that is expelled from a wiping range of the wiper increases, and it is possible that the washer fluid in the wiping range of the wiper may become insufficient. In particular, it is possible that washer fluid could become conspicuously insufficient in a range from the vicinity of the center between the upper and lower return positions of the wiper to the upper side return position, since there is only a small difference in angle between the direction of the centrifugal force acting on the washer fluid and the direction of the force acting on the washer fluid from the airflow of the passing air.

The wiper is normally operated together with the washer. It is therefore efficient to install a wiper control circuit for controlling drive of the wiper body that drives the wiper, and a pump control circuit for controlling drive of a washer pump, in the wiper motor. However, since the wiper motor accordingly includes not only a drive device for the motor body that drives the wiper, but also a drive device that drives the washer pump provided separately to the wiper motor, wiring electrically connected to both drive devices forms an antenna, emitting noise. When the connectors and the drive devices are disposed at a distance from each other, the wiring between them becomes longer, and it becomes paramount to suppress the noise emitted from the wiper motor.

An object of the present disclosure is to obtain a wiper device capable of suppressing a lack of washer fluid in a wiping range of a wiper in cases in which a washer switch is switched ON when a vehicle is travelling at high speed.

Another object of the present disclosure is to obtain a wiper motor capable of reducing noise emission even when the wiper motor includes circuits to drive and control a wiper and a washer.

SUMMARY

A wiper device of the present disclosure includes: a wiper motor that uses a wiper to perform a wiping operation between first and second return positions on a wiped surface; and a controller that controls the wiper motor such that a wiping operation by the wiper is performed at a first wiping period for plural cycles in cases in which a vehicle speed detected by a vehicle speed detection section is below a specific speed when a washer switch is switched ON to instruct washer fluid to be squirted by a washer pump, and controls the wiper motor such that a wiping operation of plural cycles by the wiper begins by starting at a second wiping period that is longer than the first wiping period in cases in which the vehicle speed detected by the vehicle speed detection section is the specific speed or greater when the washer switch is switched ON.

The wiper device configured as described above includes the wiper motor that uses the wiper to perform a wiping operation, and the controller that controls the wiper motor. When the washer switch is switched ON in a state in which the vehicle is travelling at low speed, force acting on washer fluid that has landed on a glass face due to an airflow caused by passing air is small, and so the likelihood of insufficient washer fluid remaining within a wiping range of the wiper is low. The controller therefore controls the wiper motor such that a wiping operation by the wiper is performed at the first wiping period for plural cycles in cases in which the vehicle speed detected by the vehicle speed detection section is below the specific speed when the washer switch is switched ON to instruct washer fluid to be squirted by the washer pump.

When the washer switch is switched ON in a state in which the vehicle is travelling at high speed, force acting on the washer fluid that has landed on the glass face from the airflow of the passing air becomes greater, and in addition to a centrifugal force due to the wiping operation by the wiper, increases the likelihood of the washer fluid being expelled from the wiping range of the wiper, leading to insufficient washer fluid in the wiping range. The controller accordingly controls the wiper motor such that the wiping operation of plural cycles by the wiper begins by starting at the second wiping period that is longer than the first wiping period in cases in which the vehicle speed detected by the vehicle speed detection section is the specific speed or greater when the washer switch is switched ON.

When the washer switch is switched ON when the vehicle is at the specific speed or greater, the centrifugal force acting on the washer fluid accompanying the wiping operation by the wiper is smaller if the wiping operation by the wiper is performed at the second wiping period than if the wiping operation by the wiper is started at the first wiping period. This thereby enables the amount of washer fluid expelled from the wiping range of the wiper to be reduced when the washer switch is switched ON while the vehicle is travelling at high speed. The washer fluid in the wiping range of the wiper can accordingly be suppressed from becoming insufficient.

In the wiper device of the present disclosure, the controller controls the wiper motor such that the wiping operation by the wiper at the second wiping period is performed either for a first timespan until a specific duration has elapsed since switching ON the washer switch, or for a second timespan from switching ON the washer switch until a specific number of cycles of the wiping operation have been completed out of the plural cycles of the wiping operation.

According to the wiper device configured as described above, the timespan for performing the wiping operation by the wiper at the second wiping period is defined by either an elapsed duration since switching ON the washer switch, or by a number of cycles of the wiping operation. Control of the wiping operation by the wiper can accordingly be made simpler than if, for example, detection is made as to whether or not the glass face is in a lubricated state within the wiping range.

In the wiper device of the present disclosure, the controller controls the wiper motor such that the wiping operation by the wiper at the second wiping period is performed for a third timespan from switching ON the washer switch until the initial cycle of the wiping operation has been completed out of the plural cycles of the wiping operation.

According to the wiper device configured as described above, an uncanny sensation experienced by the user due to the wiping speed of the wiper changing can be reduced by performing the initial cycle out of the plural cycles of the wiping operation by the wiper at a longer wiping period than in the subsequent wiping operation.

In the wiper device of the present disclosure, the controller controls the wiper motor such that out of the respective timespans over which the wiping operation of the plural cycles is performed by the wiper, the wiping operation by the wiper is performed at a shorter wiping period than the second wiping period during a timespan that does not fall under any out of the first timespan to the third timespan.

According to the wiper device configured as described above, the glass face within the wiping range can achieve a somewhat lubricated state during the timespan in which the wiping operation by the wiper is performed at the second wiping period (any one of the first timespan to the third timespan), after which the wiping operation by the wiper is performed at a shorter wiping period than the second wiping period. This thereby enables the wiper to be suppressed from obstructing the view when the vehicle is travelling at high speed.

In the wiper device of the present disclosure, the controller begins driving of the wiper motor after a specific time delay has elapsed since switching ON the washer switch.

The wiper device configured as described above enables suppression of a state known as "dry wiping", this being a state in which the wiper slides over a dry glass face due to performing the wiping operation by the wiper before washer fluid has landed on the glass face.

In the wiper device of the present disclosure, the controller squirts washer fluid by driving the washer pump when the washer switch is switched ON.

According to the wiper device configured as described above, the controller controls both drive of the wiper motor and drive of the washer pump. There is accordingly no need to provide separate signal lines to transmit washer switch operation signals for wiper control and washer pump control separately, thereby enabling a simple configuration.

A wiper motor of the present disclosure includes: a motor body configured including a rotation shaft that rotates about an axial line and is provided with a worm; housing that includes a worm placement portion in which the worm is disposed and a wheel placement portion in which a worm wheel enmeshed with the worm is disposed, and that is coupled to the motor body; a speed reduction section that reduces the speed of rotation of the rotation shaft for output from an output shaft; and a circuit board that is housed between the housing of the speed reduction section and a cover closing off an opening in the housing, wherein the circuit board includes a wiper drive circuit that drives the motor body to drive a wiper device attached to the output shaft, a pump drive circuit that drives a washer pump, a wiper/washer control circuit that controls the wiper drive circuit and the pump drive circuit, and an external connection terminal that is input with, or outputs, at least one out of a power source connected to the external connection terminal, or an electrical signal, and that is electrically connected with the respective circuits through wiring, and wherein the pump drive circuit and the external connection terminal are disposed at positions on the circuit board corresponding to the wheel placement portion, and the wiper drive circuit is disposed on the circuit board at the worm placement portion side of the pump drive circuit.

According to the wiper motor configured as described above, when the wiper drive circuit is operated by a command from the wiper/washer control circuit, the motor body is driven and the rotation shaft rotates as a unit with the worm. The rotation of the rotation shaft is reduced in speed by the worm and the worm wheel, and transmitted to the output shaft to be output. This accordingly drives the wiper device attached to the output shaft. The washer pump is also driven when the pump drive circuit is operated by a command from the wiper/washer control circuit.

Note that in this wiper motor, the pump drive circuit and the external connection terminal are disposed on the circuit board corresponding to the wheel placement portion of the housing, and the wiper drive circuit is disposed on the circuit board at the worm placement portion side of the pump drive circuit. Such a layout enables a shorter distance between the external connection terminal, to which an external connector is connected, and the pump drive circuit that drives the washer pump, such that wiring to electrically connect them together can be kept short. Namely, by placing the pump drive circuit on the circuit board clustered together with the external connection terminal connected to the external connector, so as to correspond to the wheel placement portion, wiring between the pump drive circuit and the external connection terminal, which are not related to drive or control of the motor body itself that drives the wiper device, can be made shorter, thereby enabling a reduction in noise emission from the wiper motor. Due to disposing the wiper drive circuit further toward the worm placement portion side than the pump drive circuit, the wiper drive circuit is disposed closer to the motor body than the placement area of the pump drive circuit, thereby enabling wiring between the wiper drive circuit, that is switched to carry a relatively large drive current to the motor body, and the motor body, to be made shorter, enabling a reduction in noise emission from the wiper motor.

In the wiper motor of the present disclosure, in addition to the above configuration, the external connection terminal is disposed on the opposite side of the output shaft to the worm placement portion.

According to the wiper motor configured as described above, setting the placement of the external connection terminal as described above enables the input of noise from the wiper drive circuit to the side of the pump drive circuit or the external connection terminal to be suppressed.

In the wiper motor of the present disclosure, in addition to the above configuration, the wiper drive circuit, the pump drive circuit, and the wiper/washer control circuit are provided on a single circuit board.

According to the wiper motor configured as described above, due to attaching circuit devices configuring the respective circuits to a single circuit board, the wiper/washer control circuit can control both the wiper drive circuit and the pump drive circuit, thereby enabling a simple wiring layout to be formed connecting between them. Namely, wiring on the circuit board can be simplified and shortened in length. This thereby enables a further reduction in noise emission from the wiring of the circuit board.

In the wiper motor of the present disclosure, in addition to the above configuration, the wiper drive circuit includes a switching element that switches the motor body using PWM control; and the switching element is disposed further toward the worm placement portion side than the output shaft.

According to the wiper motor configured as described above, setting the placement of the switching element as described above enables the transmission of heat from the switching element to the pump drive circuit to be suppressed.

In the wiper motor of the present disclosure, in addition to the above configuration, the pump drive circuit is configured independently of the wiper drive circuit, and the pump drive circuit and the wiper drive circuit are controlled based on commands from the single wiper/washer control circuit.

According to the wiper motor configured as described above, controlling the pump drive circuit and the wiper drive circuit based on commands from the single wiper/washer control circuit enables, for example, wiring for electrical signals such as sensor signals to be simplified, and enables a reduction in size of the circuit board in comparison to cases in which the circuit board is separately provided with a control circuit to control the pump drive circuit, and a control circuit to control the wiper drive circuit.

DETAILED DESCRIPTION

First Exemplary Embodiment

Figure 1:
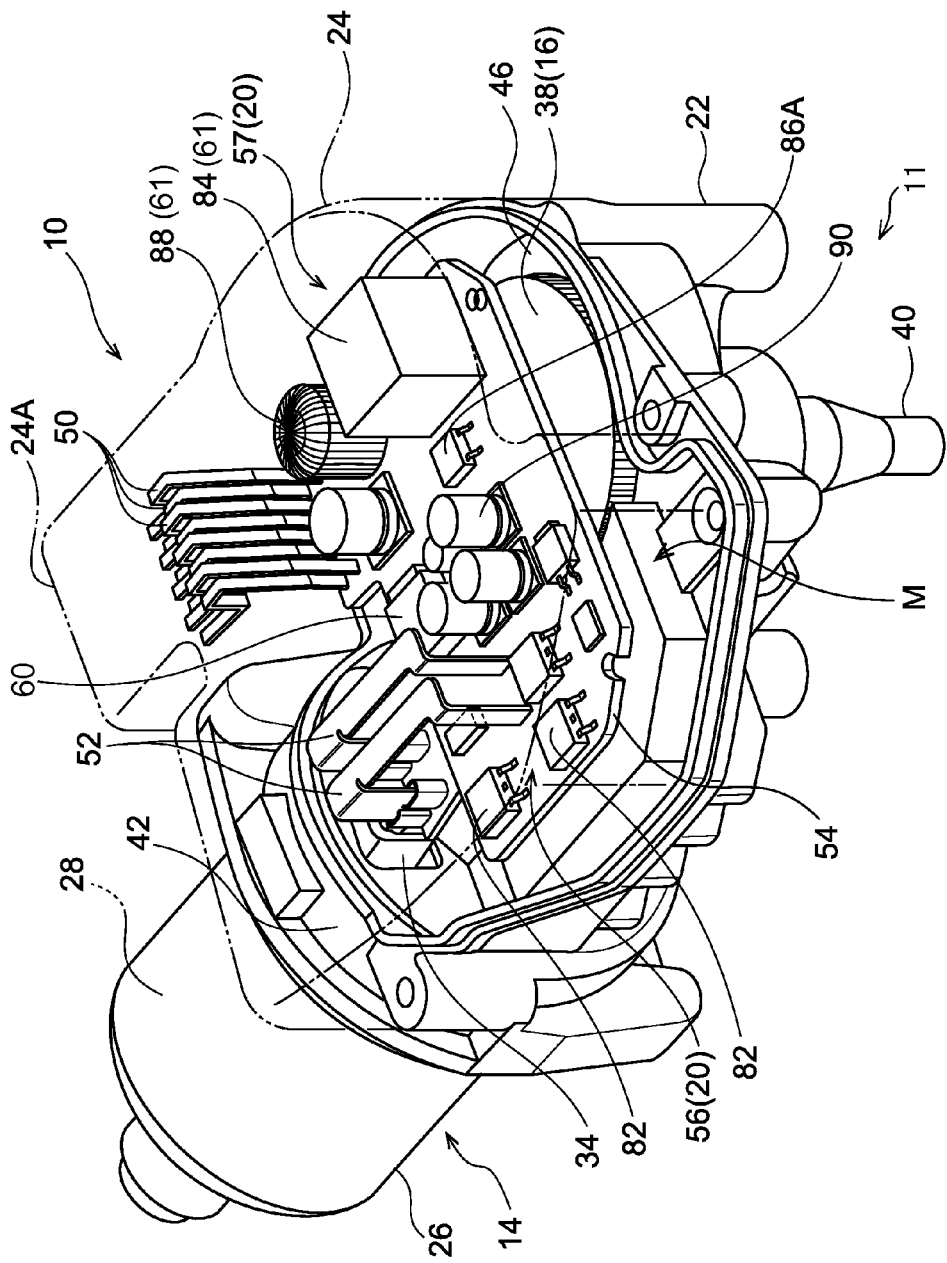
FIG. 1 is a perspective view illustrating a wiper motor as viewed from the side of a controller.

Detailed explanation follows regarding an example of an exemplary embodiment of the present disclosure, with reference to the drawings. FIG. 1 to FIG. 4 illustrate a wiper motor 10 according to the present exemplary embodiment. The wiper motor 10 is employed as a drive source for a wiper device 12 of a vehicle (car). The wiper motor 10 includes a motor body 14 (see FIG. 1 and FIG. 2) capable of forward and reverse rotation, a speed reduction section 16 (see FIG. 2) for reducing the rotation speed of the motor body 14, a controller 20 (see FIG. 1, FIG. 3, FIG. 4) for driving and controlling the motor body 14 and a washer pump 18 (see FIG. 2), housing 22 (see FIG. 1 to FIG. 3) that houses the speed reduction section 16, and a cover 24 (see FIG. 1 to FIG. 3) attached to the housing 22.

Figure 2:
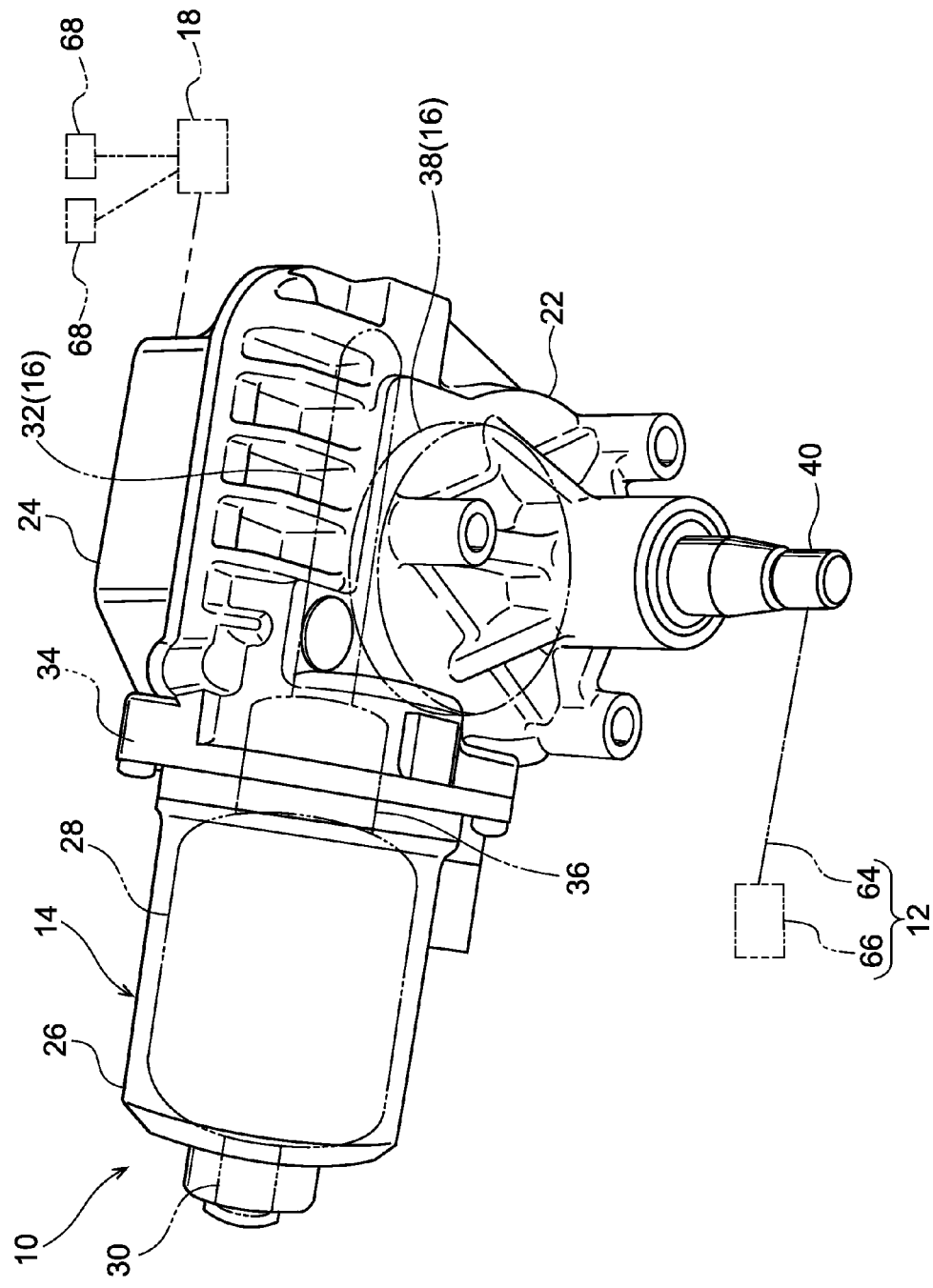
FIG. 2 is a perspective view illustrating a wiper motor as viewed from the side of an output shaft.

The motor body 14 is configured by what is known as a brushed DC motor. The motor body 14 includes a motor yoke 26 with a bottomed, substantially circular cylinder shape. Four permanent magnets are fixed to an inner peripheral face of the motor yoke 26, and the permanent magnets configure a four-pole motor with the N, S poles of the magnets disposed alternately to each other around the circumferential direction of the motor yoke 26. As illustrated in FIG. 2, an armature 28 that is capable of rotating freely is housed to the inside of the permanent magnets in the motor yoke 26. The armature 28 includes a rotation shaft 30, and the rotation shaft 30 is formed in a substantially circular rod shape, disposed coaxially to the motor yoke 26. One axial direction end portion of the rotation shaft 30 is rotatably supported by a bottom portion of the motor yoke 26 through a shaft bearing.

Another axial direction end portion of the rotation shaft 30 is disposed inside the housing 22, described later, and is rotatably supported by the housing 22. A portion of the rotation shaft 30 on the other axial direction end side is integrally formed with a worm 32 configuring part of the speed reduction section 16. As illustrated in FIG. 1, the motor body 14 includes a brush holder device 34 (see FIG. 2). The brush holder device 34 is disposed at a radial direction outside of a commutator 36 (see FIG. 2) provided to the armature 28, and is formed in a substantially annular shape. The brush holder device 34 is provided with two brushes separated from each other by 90° around the circumferential direction of the brush holder device 34, and the brushes contact the commutator 36 of the armature 28 so as to be capable of brushing against the commutator 36.

As illustrated in FIG. 2, the speed reduction section 16 is housed inside the housing 22, and includes the worm 32, mentioned above, and a worm wheel 38. The worm wheel 38 has a substantially circular plate shape, and is fixed to an end portion on one axial direction end side of an output shaft 40. An outer circumferential portion of the worm wheel 38 enmeshes with the worm 32, and the rotation of the rotation shaft 30 is reduced in speed by a specific speed reduction ratio and transmitted to the output shaft 40. A circular disk shaped sensor magnet, magnetized with two poles, is fixed to a location on an end face on the one axial direction end side of the output shaft 40. A wiper motor absolute angle position sensor 72 is provided on a circuit board 54 that faces the sensor magnet and configures the controller 20. The wiper motor absolute angle position sensor 72 detects the rotation direction and rotation amount of the output shaft 40 using a magnetoresistive device, and thereby detects an absolute angle position of a wiper arm 64 coupled to the output shaft 40 through a link mechanism, and of a wiper blade 66 attached to a leading end portion of the wiper arm 64 (detects an angle position of the wiper blade 66 between a lower side return position and an upper side return position).

Figure 3:
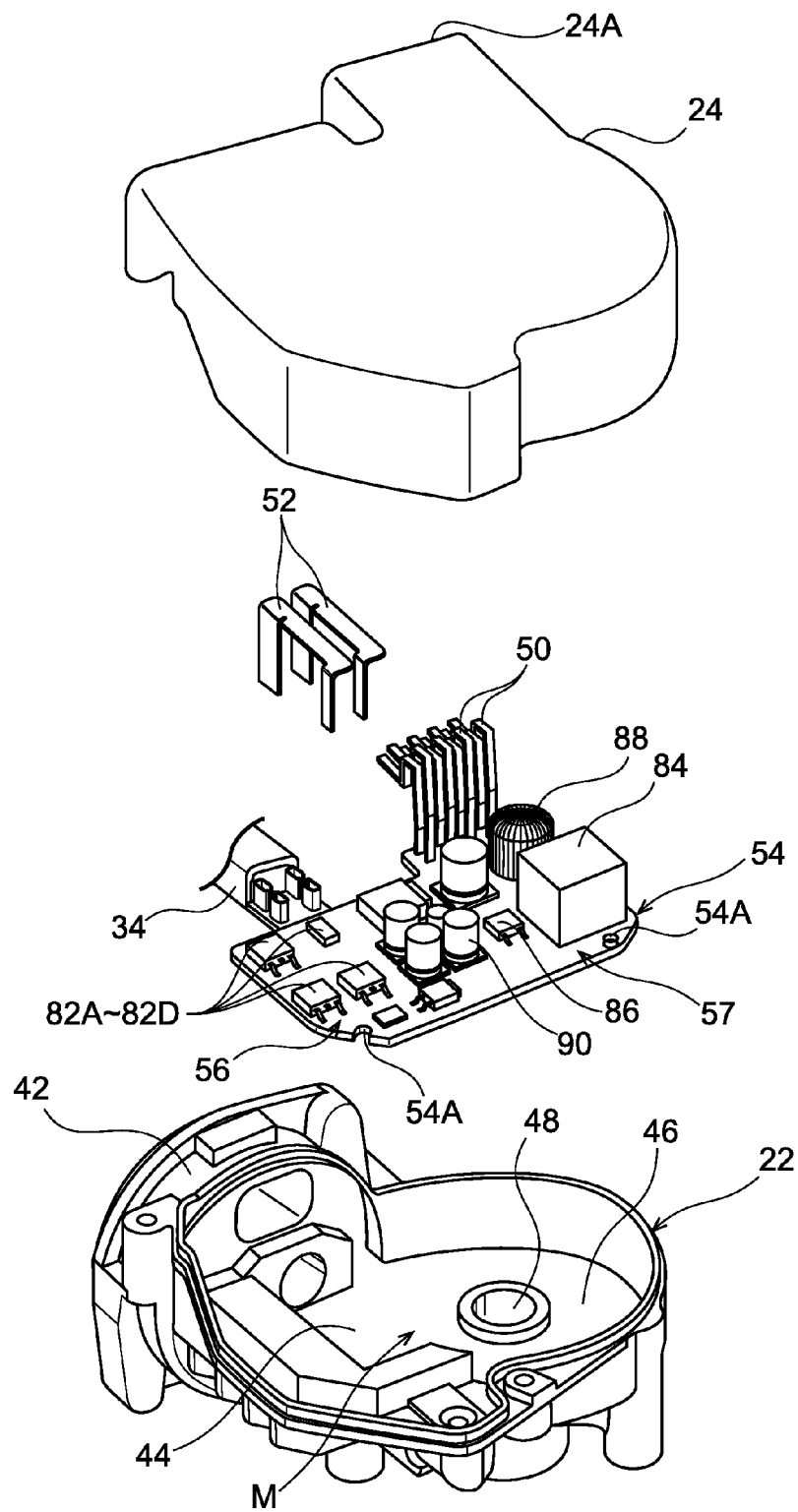
FIG. 3 is an exploded perspective view illustrating housing, a controller, a cover, etc. in a wiper motor.

As illustrated in FIG. 3, the housing 22 is formed substantially in a box shape, is disposed on the other side of the rotation shaft 30 to the motor yoke 26 (see FIG. 2) in the axial direction of the rotation shaft 30 (on the open side of the motor yoke 26), and is coupled to the motor body 14 by screws or the like. More specifically, the housing 22 is manufactured from aluminum (or an aluminum alloy) by die casting or the like, and is formed substantially in a box shape, open toward the opposite side to the projection direction of the output shaft 40. The housing 22 is integrally formed with a holder housing portion 42 for housing and supporting the brush holder device 34 of the motor body 14 mentioned above. The housing 22 is also formed with a worm housing portion 44 for housing the worm 32, and a worm wheel housing portion 46 for housing the worm wheel 38. A support hole 48 through which the output shaft 40 is inserted, and that axially supports the output shaft 40, is formed at a central portion of the worm wheel housing portion 46.

The cover 24 is manufactured from an insulating resin material by injection molding or the like, and is formed substantially in a box shape, opening toward the side of the housing 22. The cover 24 is insert molded with external connection terminals 50, to which a wiper drive circuit 56, a pump drive circuit 57, and a wiper/washer control circuit 58 (see FIG. 4) on the circuit board 54, described later, are electrically connected. The cover 24 is further insert molded with connection terminals 52 that connect the wiper drive circuit 56 to the brushes of the brush holder device 34 and supply power to the motor. Namely, the external connection terminals 50 and the connection terminals 52 are integrated to the cover 24 by insert molding with an insulating resin material. The external connection terminals 50 are connected to external connectors for input and output of electrical signals to and from a vehicle speed sensor 92, a rain sensor, and the like, and for power supply.

The external connection terminals 50 and the connection terminals 52 insert molded to the cover 24 are soldered to the circuit board 54, described in detail later, and the circuit board 54 is fixed to an inside face of the cover 24 by inserting screws through insertion holes 54A in the circuit board 54 and screwing them into the cover 24. The cover 24, to which the circuit board 54 is fixed, is then attached to the housing 22 so as to dispose the circuit board 54 in a sealed space M formed between the cover 24 and the housing 22. The speed reduction section 16 mentioned above (the worm 32 and the worm wheel 38) is also disposed inside the sealed space M. The cover 24 is formed with a connector portion 24A, to which the external connectors are connected.

Figure 4:
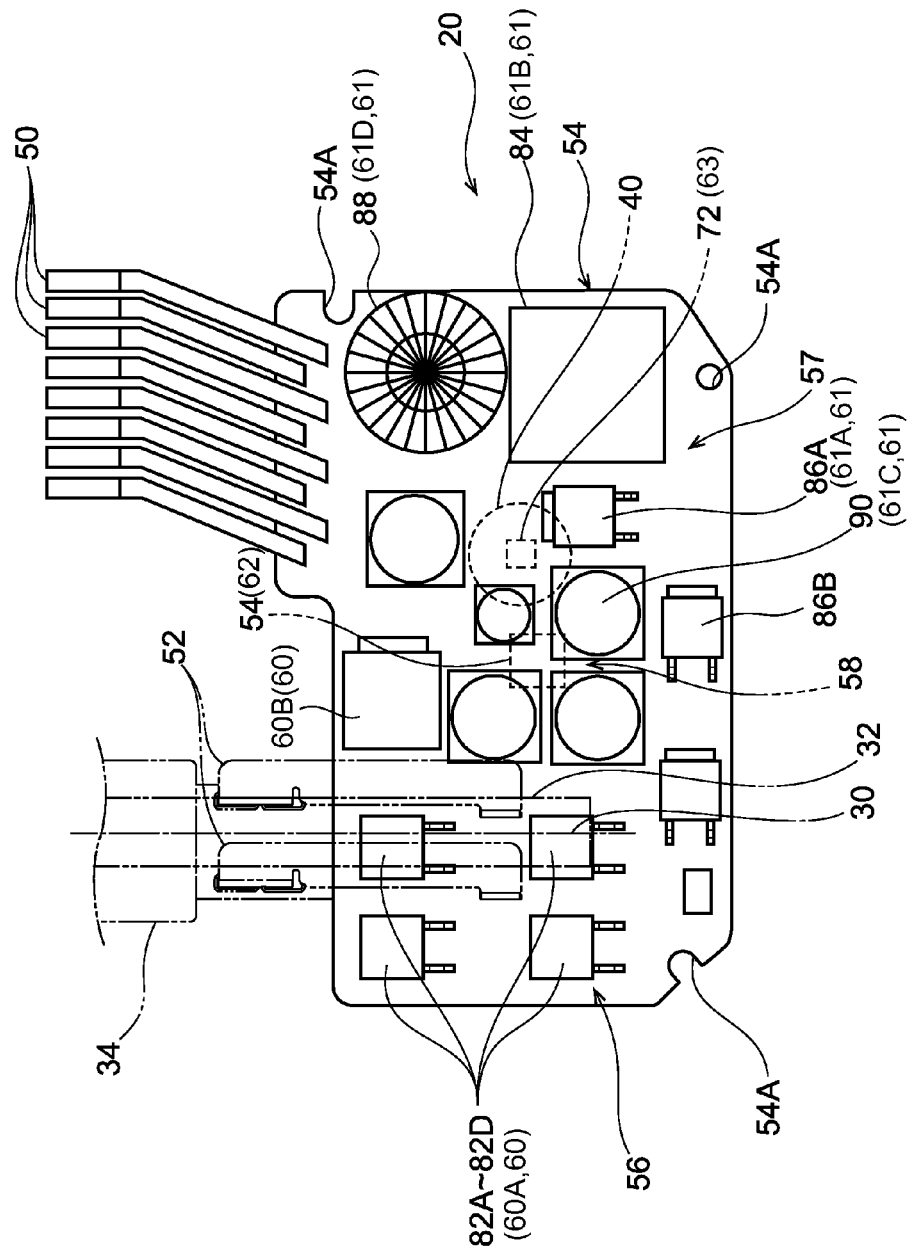
FIG. 4 is a plan view of a controller, as viewed from one axial direction side of an output shaft.
Figure 5:
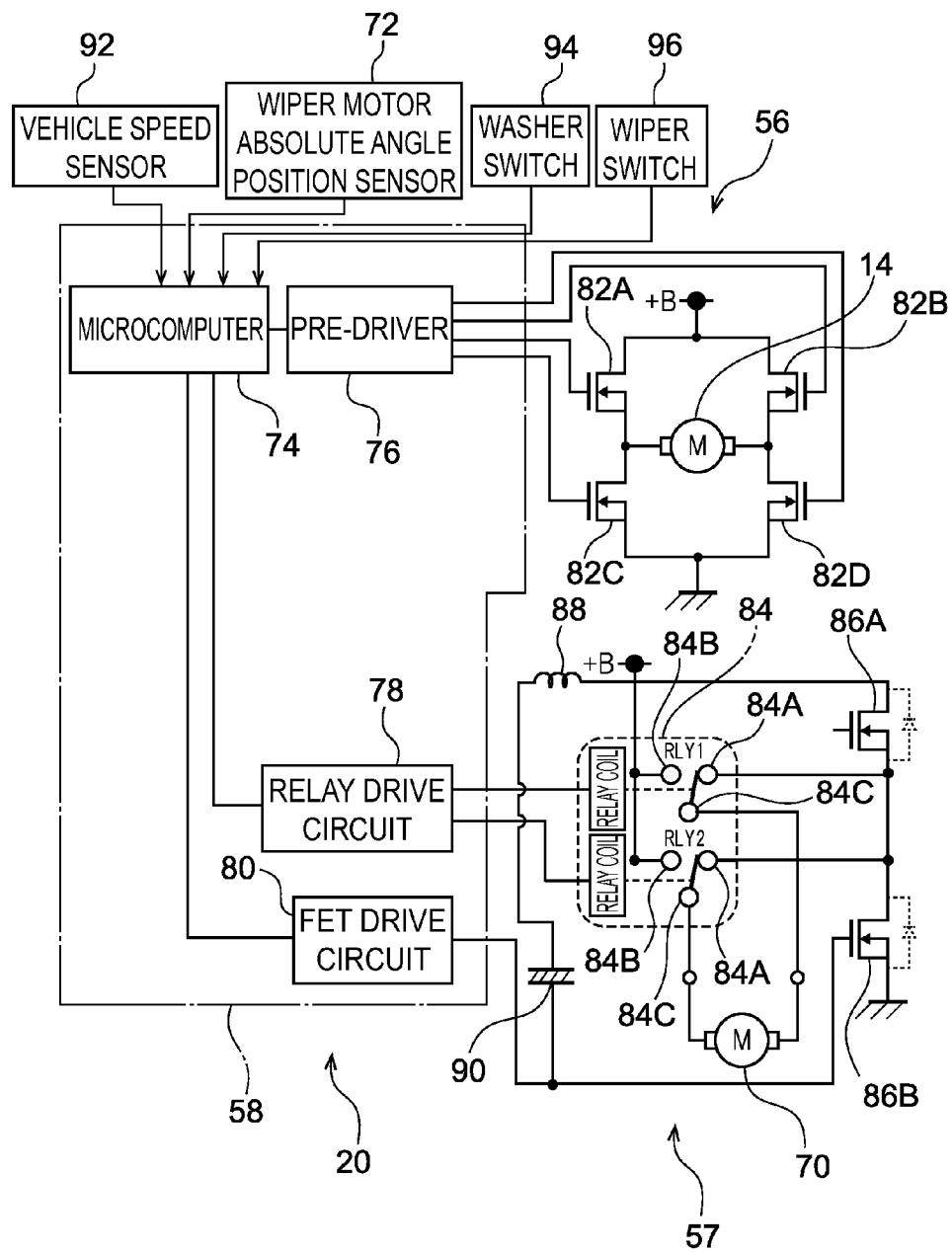
FIG. 5 is a circuit diagram schematically illustrating circuits of a controller.

As illustrated in FIG. 4, in the controller 20, plural circuit devices (for example, FETs 82A to 82D and a relay unit 84, described later) are attached to the single circuit board 54. As illustrated in FIG. 5, the controller 20 includes the wiper drive circuit 56 that swings the wiper arm 64 coupled to the output shaft 40 through the link mechanism back and forth by driving the motor body 14 of the wiper motor 10, the pump drive circuit 57 that drives a motor 70 of the washer pump 18, and the wiper/washer control circuit 58 that controls the wiper drive circuit 56 and the pump drive circuit 57.

The wiper/washer control circuit 58 includes a microcomputer 74, a pre-driver 76, a relay drive circuit 78, and a FET drive circuit 80. The microcomputer 74 includes a CPU, ROM stored with a program executed by the CPU, and RAM employed as a workspace during execution of the program by the CPU. The pre-driver 76, the relay drive circuit 78, and the FET drive circuit 80 will be described later.

The wiper drive circuit 56 includes the four FETs 82A to 82D. The drain of the FET 82A is connected to a power source (+B), the gate of the FET 82A is connected to the pre-driver 76, and the source of the FET 82A is connected to one end portion of the motor body 14 of the wiper motor 10. The drain of the FET 82B is connected to the power source (+B), the gate of the FET 82B is connected to the pre-driver 76, and the source of the FET 82B is connected to another end portion of the motor body 14 of the wiper motor 10. The drain of the FET 82C is connected to the one end portion of the motor body 14 of the wiper motor 10, the gate of the FET 82C is connected to the pre-driver 76, and the source of the FET 82C is connected to ground. The drain of the FET 82D is connected to the other end portion of the motor body 14 of the wiper motor 10, the gate of the FET 82D is connected to the pre-driver 76, and the source of the FET 82D is connected to ground.

The pre-driver 76 controls drive of the motor body 14 of the wiper motor 10 by switching control signals supplied to the gates of the FETs 82A to 82D. Namely, the pre-driver 76 turns the pair of the FET 82A and the FET 82D ON in order to rotate the output shaft 40 of the motor body 14 in a specific direction, and the pre-driver 76 turns the pair of the FET 82B and the FET 82C ON in order to rotate the output shaft 40 of the motor body 14 in the opposite direction to the specific direction. The pre-driver 76 also performs pulse width modulation (PWM) to vary the proportion (duty cycle) of the time in a specific control period during which the ON FET 82 pairs are switched ON, according to a target rotation speed of the output shaft 40 of the motor body 14. This control controls both the rotation direction and the rotation speed of the output shaft 40 of the motor body 14 of the wiper motor 10.

The pump drive circuit 57 includes a relay unit 84 installed with two relays RLY1, RLY2, and also includes two FETs 86A, 86B, a choke coil 88, and an electrolytic capacitor 90. Relay coils of the relays RLY1, RLY2 of the relay unit 84 are respectively connected to the relay drive circuit 78. The relay drive circuit 78 switches the relays RLY1, RLY2 ON and OFF (excitation/non-excitation of the relay coils). When the relay coils of the relays RLY1, RLY2 are not excited, common terminals 84C are maintained in a connected state with first terminals 84A (the state illustrated in FIG. 5: an OFF state). When the relay coils of the relays RLY1, RLY2 are excited, the common terminals 84C are switched to a state connected with second terminals 84B. The common terminal 84C of the relay RLY1 is connected to one end portion of the motor 70 of the washer pump 18, and the common terminal 84C of the relay RLY2 is connected to the other end portion of the motor 70 of the washer pump 18. The first terminals 84A of the relays RLY1, RLY2 are connected to the drain of the FET 86B, and the second terminals 84B of the relays RLY1, RLY2 are connected to the power source (+B).

The gate of the FET 86B is connected to the FET drive circuit 80, and the source of the FET 86B is connected to ground. ON and OFF switching of the FET 86B, and the duty cycle of the time when the FET 86B is ON (the proportion of the time in a specific control period when the FET 86B is turned ON), are controlled by the FET drive circuit 80. The FET 86A is provided between the drain of the FET 86B and the power source (+B). The FET 86A is not switched ON and OFF as its gate is not input with a control signal, and is provided as a parasitic diode used to absorb surge. The choke coil 88 and the electrolytic capacitor 90 are connected in series between the power source (+B) and the gate of the FET 86B. The choke coil 88 and the electrolytic capacitor 90 of function as a noise filter to remove noise.

The relay drive circuit 78 and the FET drive circuit 80 switch the two relays RLY1, RLY2 and the FET 86B ON and OFF to control drive of the motor 70 of the washer pump 18. Namely, the relay drive circuit 78 switches ON the relay RLY1 (with the relay RLY2 OFF), and the FET drive circuit 80 switches ON the FET 86B at a specific duty cycle, in order to rotate an output shaft of the motor 70 of the FET drive circuit 80 in the specific direction. The relay drive circuit 78 switches ON the relay RLY2 (with the relay RLY1 OFF), and the FET drive circuit 80 switches ON the FET 86B at a specific duty cycle, in order to rotate the output shaft of the motor 70 of the washer pump 18 in the opposite direction to the specific direction. The rotation direction and the rotation speed of the output shaft of the motor 70 of the washer pump 18 are controlled in the above manner.

The microcomputer 74 is connected to the pre-driver 76, the relay drive circuit 78 and the FET drive circuit 80 respectively. The microcomputer 74 is input with electrical signals from the vehicle speed sensor 92, the rain sensor, the wiper motor absolute angle position sensor 72, a washer switch 94, a wiper switch 96, and the like. The vehicle speed sensor 92 inputs the microcomputer 74 with a vehicle speed signal indicating a detection result for the speed of the vehicle to which the wiper motor 10 is installed. The wiper motor absolute angle position sensor 72 inputs the microcomputer 74 with an absolute angle position signal indicating the absolute angle position (position and movement direction) of the wiper blade 66 (the wiper arm 64, namely the output shaft 40 of the wiper motor 10). The washer switch 94 inputs the microcomputer 74 with a washer switch operation signal indicating whether or not the washer switch 94 has been switched ON. The wiper switch 96 inputs the microcomputer 74 with a wiper switch operation signal indicating whether or not the wiper switch 96 has been operated, and, in cases in which the wiper switch 96 has been operated, which operation mode is selected (such as a low speed operation mode, a high speed operation mode, an intermittent operation mode, or an auto operation mode).

Next, explanation follows regarding operation of the present exemplary embodiment. When the wiper switch 96 has been operated so as to instruct the wiper blade 66 to wipe the windshield, the wiper switch operation signal input to the microcomputer 74 changes according to the operation, and the microcomputer 74 detects that the operation has been performed. The microcomputer 74 identifies the instructed operation mode based on the change in the wiper switch operation signal. The microcomputer 74 then controls drive of the motor body 14 by instructing the pre-driver 76 with the appropriate rotation direction and rotation speed of the rotation shaft 30 of the motor body 14, while constantly monitoring the absolute angle position (position and movement direction) of the wiper blade 66 using the absolute angle position signal input from the wiper motor absolute angle position sensor 72, in order to perform a wiping operation corresponding to the identified operation mode.

The pre-driver 76 drives the motor body 14 by switching the pair of FETs 82 corresponding to the rotation direction instructed by the microcomputer 74 ON and OFF at a duty cycle corresponding to the rotation speed instructed by the microcomputer 74. When the motor body 14 is driven, the rotation shaft 30 of the motor body 14 rotates as a unit with the worm 32, and this rotation is reduced in speed by the worm 32 and the worm wheel 38 and transmitted to the output shaft 40. The wiper arm 64 coupled to the output shaft 40 through the link mechanism accordingly swings at a speed according to the operation mode, and the wiper blade 66 attached to the leading end portion of the wiper arm 64 performs a wiping operation to wipe the windshield at a wiping speed according to the operation mode.

Every time the microcomputer 74 detects from the absolute angle position signal that the wiper blade 66 has reached either the upper side return position or the lower side return position, the rotation direction for the rotation shaft 30 of the motor body 14 instructed to the pre-driver 76 is switched to the opposite direction. The wiper arm 64 accordingly swings back and forth, and the wiper blade 66 moves back and forth between the upper side return position and the lower side return position, performing a wiping operation to wipe the windshield.

Figure 6:
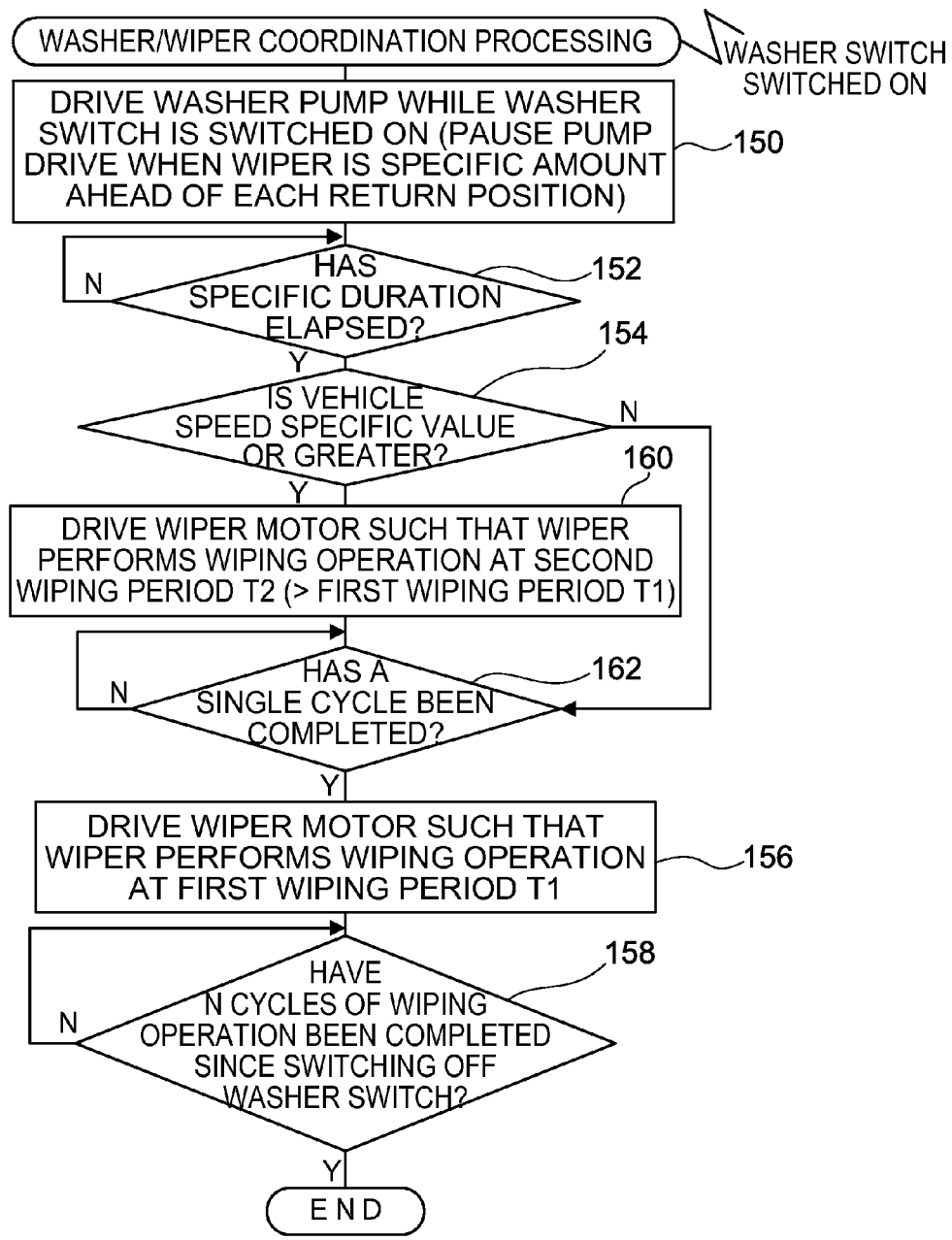
FIG. 6 is a flowchart illustrating washer/wiper coordination processing.

Next, explanation follows with reference to FIG. 6, regarding washer/wiper coordination processing executed when the microcomputer 74 detects from a wiper switch operation signal input from the washer switch 94 that the washer switch 94 has been switched ON.

At step 150 of the washer/wiper coordination processing, the microcomputer 74 controls drive of the motor 70 of the washer pump 18 by instructing the relay drive circuit 78 and the FET drive circuit 80 with the rotation direction and the rotation speed for the motor 70 of the washer pump 18. The relay drive circuit 78 switches ON either one out of the two relays RLY1, RLY2 according to the rotation direction instructed by the microcomputer 74, and the FET drive circuit 80 switches ON the FET 86B at a duty cycle according to the rotation speed instructed by the microcomputer 74. This accordingly drives the motor 70 of the washer pump 18. Note that in the present exemplary embodiment, in the vehicle installed with the wiper motor 10, nozzles 68, connected to the washer pump 18, are attached to the wiper arm 64. Washer fluid is accordingly squirted toward the windshield from leading ends of the nozzles 68 attached to the wiper arm 64 accompanying drive of the motor 70 of the washer pump 18.

More specifically, the washer pump 18 is what is known as a double outlet pump with selective discharge from one of two outlets, according to the rotation direction of the motor 70. Two hose systems, respectively connected to each of the outlets, are respectively connected to the two nozzles 68 attached to the wiper arm 64. The windshield is selectively squirted by either one of the two nozzles 68 according to the wiping direction (swing direction of the wiper arm 64) and position of the wiper blade 66.

In parallel to drive control of the motor body 14 of the wiper motor 10, described later, the microcomputer 74 also drives the motor 70 of the washer pump 18 for a timespan during which the washer switch 94 is switched ON. Namely, the microcomputer 74 is capable of driving the motor 70 of the washer pump 18 until a single cycle of the wiper blade 66 has been substantially completed, while constantly monitoring the absolute angle position (position and direction) of the wiper blade 66 using the absolute angle position signals. The microcomputer 74 also pauses drive of the motor 70 of the washer pump 18 during a timespan between the wiper blade 66 reaching a position a specific amount just ahead of the upper side return position, and the wiper blade 66 reaching the upper side return position. Drive of the motor 70 of the washer pump 18 is also paused when the wiper blade 66 reaches a position a specific amount ahead of the lower side return position.

FIGS. 7 illustrate a state in which the washer switch 94 remains switched ON for a single cycle of the wiper blade 66. However, if the washer switch 94 is still switched ON after completion of a single cycle of the wiper blade 66, the washer pump 18 is operated continuously, with the exception of within the specific amounts ahead of the respective return positions. When the washer switch 94 is switched ON for less than a single cycle of the wiper blade 66, the washer pump 18 is only operated while the washer switch 94 is switched ON.

Driving the motor 70 of the washer pump 18 in the above manner suppresses washer fluid squirted from the leading ends of the nozzles 68 attached to the wiper arm 64 from hitting the glass face of the windshield at positions outside of a wiping range of the wiper blade 66.

At the next step 152, the microcomputer 74 determines whether or not a specific duration has elapsed since starting drive of the motor 70 of the washer pump 18. The specific duration referred to here may be a duration corresponding to the length of time needed from starting drive of the motor 70 of the washer pump 18 (from switching ON the washer switch 94) until a state is reached in which washer fluid squirted from the leading ends of the nozzles 68 has landed on the glass face of the windshield, and specifically, may for example be a duration of approximately 0.5 sec. When determination is negative at step 152, step 152 is repeated until affirmative determination is made.

Accordingly, a state known as "dry wiping", this being a state in which the wiper blade 66 slides over a dry glass face due to the wiper blade 66 performing a wiping operation before washer fluid has landed on the glass face of the windshield, can be suppressed since the wiping operation by the wiper blade 66 is not performed until the specific duration has elapsed since starting drive of the motor 70 of the washer pump 18.

Processing transitions to step 154 when determination is affirmative at step 152. At step 154, the microcomputer 74 determines whether or not the current speed of the vehicle installed with the wiper motor 10 is a specific value or greater. When the vehicle is travelling, the washer fluid landing on the glass face of the windshield is subject to force in a direction toward an upper end portion of the windshield due to an airflow caused by passing air. The specific value mentioned above may be set at a speed at which the force on the washer fluid due to the airflow of the passing air becomes conspicuous, specifically at a speed of, for example, approximately 80 km/h to 100 km/h. A different speed may, however, be set.

When the current speed of the vehicle is below the specific value, determination is negative at step 154, and processing transitions to step 156. At step 156, using the pre-driver 76, the microcomputer 74 controls the wiper motor 10 to rotate the motor body 14 of the wiper motor 10 at a first rotation speed V1, such that the wiper blade 66 performs the wiping operation over a relatively short first wiping period T1 (a wiping period corresponding to the first rotation speed V1). At the next step 158, the microcomputer 74 determines whether or not N cycles of the wiping operation have been completed by the wiper blade 66 since switching OFF the washer switch 94. When determination is negative, the processing of step 158 is repeated until affirmative determination is made. Then, once N cycles of the wiping operation have been completed at the first wiping period T1 since switching OFF the washer switch 94, determination is affirmative at step 158, and the washer/wiper coordination processing ends.

Figure 7A:
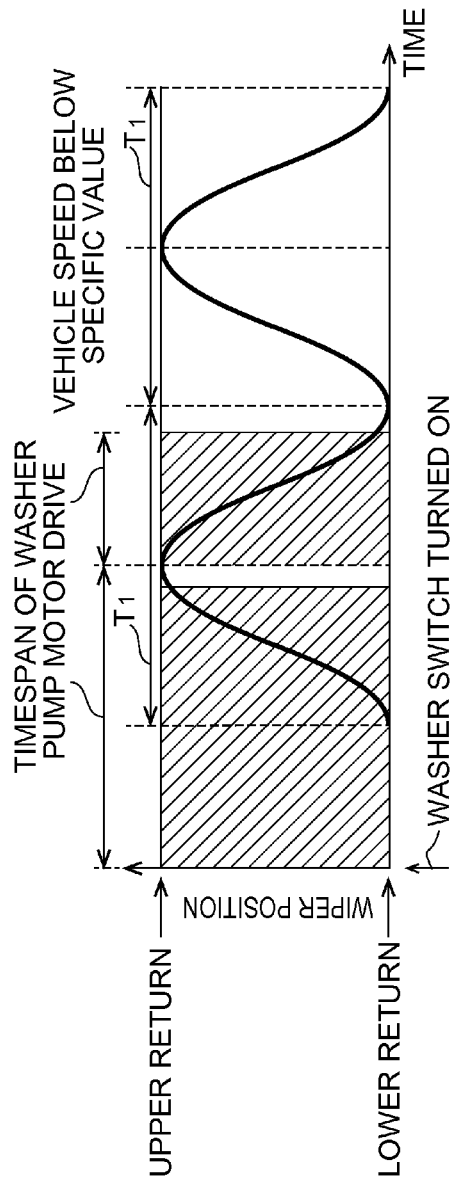
FIG. 7A is a line graph illustrating change over time in the position of a wiper blade in washer/wiper coordination processing when at a vehicle speed below a specific value.

As illustrated in FIG. 7A, in cases in which the current speed of the vehicle is below the specific value, when the washer switch 94 is switched ON, the motor body 14 of the wiper motor 10 is accordingly driven at the first rotation speed V1, and the wiper blade 66 performs the wiping operation over the first wiping period T1, after the specific duration since switching ON the washer switch 94. The wiper motor 10 is then stopped after performing the wiping operation for N cycles (for example two cycles) after the washer switch 94 has been switched OFF. Accordingly, the windshield is wiped by the wiper blade 66 while squirting washer fluid toward the windshield during the first cycle of plural cycles of the wiping operation by the wiper blade 66.

The vehicle speed in this case is a speed at which the washer fluid is subject to a relatively small force from the airflow of the passing air, and so the washer fluid landing on the glass face of the windshield is suppressed from being expelled from the wiping range of the wiper blade 66 even when the motor body 14 of the wiper motor 10 is driven at the first rotation speed V1 as described above, and the wiper blade 66 performs plural cycles of the wiping operation at the first wiping period Ti.

Specifically, the first wiping period T1 may be set at a preferable value of, for example, 42 cycles/minute (wiping period T1≈1.4 sec). However, other speeds may be set.

When the current speed of the vehicle is the specific value or greater, determination is affirmative at step 154, and processing transitions to step 160. At step 160, using the pre-driver 76, the microcomputer 74 controls the wiper motor 10 so as to rotate the motor body 14 of the wiper motor 10 at a second rotation speed V2 that is slower than the first rotation speed V1, such that the wiper blade 66 performs a wiping operation over a second wiping period T2 (a wiping period corresponding to the second rotation speed V2) that is longer than the first wiping period T1. At the next step 162, the microcomputer 74 determines whether or not the wiper blade 66 has completed a single cycle of the wiping operation, and when determination is negative, step 162 is repeated until affirmative determination is made.

Figure 7B:
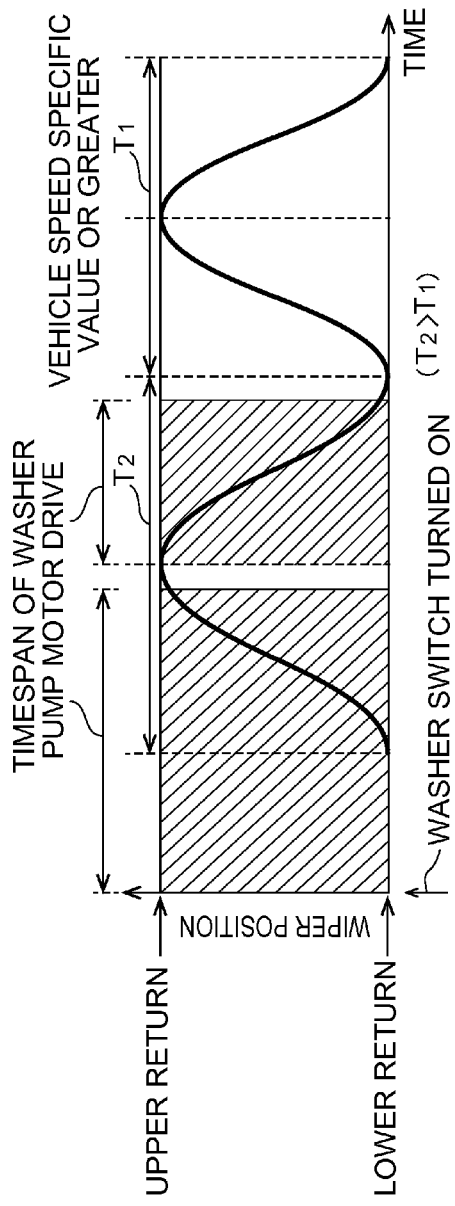
FIG. 7B is a line graph illustrating change over time in the position of a wiper blade in washer/wiper coordination processing when at a specific vehicle speed or greater.

Accordingly, as illustrated in FIG. 7B, when the current speed of the vehicle is the specific value or greater, on switching ON the washer switch 94, the motor body 14 of the wiper motor 10 is driven at the second rotation speed V2 after the specific duration since switching ON the washer switch 94, and the wiper blade 66 performs the first cycle of the wiping operation over the second wiping period T2 (T2>T1). Normally, in the first cycle of the wiping operation, the wiper blade 66 wipes the windshield while washer fluid is squirted toward the windshield.

The vehicle speed in this case is a speed at which the washer fluid is conspicuously subject to force from the airflow of the passing air. However, the motor body 14 of the wiper motor 10 is rotated at the second rotation speed V2, this being slower than the first rotation speed V1, and the wiper blade 66 performs the wiping operation over the second wiping period T2, this being longer than the first wiping period T1. The washer fluid that has landed on the glass face of the windshield is therefore subject to less centrifugal force accompanying the wiping operation by the wiper blade 66 than when the wiping operation by the wiper blade 66 is performed over the shorter first wiping period T1. The washer fluid that has landed on the glass face of the windshield is accordingly suppressed from being expelled from the wiping range of the wiper blade 66.

In particular, out of the wiping range of the wiper blade 66, there is a possibility of the washer fluid becoming conspicuously insufficient over a range from the vicinity of the center between the upper and lower return positions of the wiper blade 66, where the wiping speed of the wiper blade 66 is at its greatest, to the upper side return position, since there is a small difference in angle between the direction of the centrifugal force to which the washer fluid is subject, and the direction of the force from the airflow of the passing air to which the washer fluid is subject. However, performing the wiping operation by the wiper blade 66 over the longer second wiping period T2 reduces the size of a compound vector of the centrifugal force to which the washer fluid is subject accompanying the wiping operation by the wiper blade 66, and the force to which the washer fluid is subject from the airflow due to passing air, in the range described above. The washer fluid is accordingly suppressed from being expelled from the wiping range of the wiper blade 66 in the range described above.

Note that a water film thickness $h_m$ at a position of maximum contact pressure of a contact portion between the wiper blade 66 and the glass face of the windshield is obtained by the following equation.

$$h_m = \sqrt{\frac{8}{9} \cdot \frac{\eta \cdot U}{\left(\frac{dP}{dx}\right)_{max}}}$$

$h_m$: water film thickness at maximum contact pressure position of contact portion
η: coefficient of viscosity (water)
U: movement speed (wiping speed) of wiper blade $\left(\frac{dP}{dx}\right)_{max}$: maximum pressure gradient value As is clear from the above equation, the water film thickness $h_m$ becomes smaller (thinner) the lower the wiping speed of the wiper blade 66. Accordingly, performing the first cycle of the wiping operation at the second wiping period T2 that is longer than the first wiping period T1 employed during low speed travel (reducing the wiping speed of the wiper blade 66) reduces refraction and diffuse reflection of the water film immediately after performing the first cycle of the wiping operation, thereby obtaining the advantageous effect of improving wiping performance during the first cycle of the wiping operation.

Specifically, the second wiping period T2 may be set at a preferable value of, for example, 35 cycles/minute (wiping period T1≈1.7 sec). However, another period may be set as long as it is a longer period than the first wiping period Ti.

When the first cycle of the wiping operation has been completed at the second wiping period T2, determination is affirmative at step 162, and processing transitions to step 156. At step 156, using the pre-driver 76, the microcomputer 74 controls the wiper motor 10 to rotate the motor body 14 of the wiper motor 10 at the first rotation speed V1, such that the wiper blade 66 performs the wiping operation at the first wiping period T1. At the next step 158, the microcomputer 74 determines whether or not the wiper blade 66 has completed N cycles of the wiping operation since switching OFF the washer switch 94. When determination is negative, step 158 is repeated until affirmative determination is made. When N cycles of the wiping operation have been completed at the first wiping period T1 since switching OFF the washer switch 94, affirmative determination is made at step 158, and the washer/wiper coordination processing ends.

In cases in which the vehicle speed is the specific value or greater when the washer switch 94 is switched ON, the first cycle of the wiping operation is performed at the second wiping period T2, followed by performing the wiping operation over the shorter first wiping period T1. This thereby enables the wiper blade 66 and the wiper arm 64 to be suppressed from obstructing the view after the washer switch 94 has been switched OFF in a timespan after completion of the first cycle of the wiping operation (once lubricated with the washer fluid), when the vehicle is travelling at a speed of the specific value or greater, compared to cases in which the wiping operation is performed at the second wiping period T2.

Explanation has been given regarding a configuration in which, in cases in which the vehicle speed is the specific value or greater when the washer switch 94 is switched ON, the first cycle of the wiping operation is performed at the second wiping period T2, and once the first cycle of the wiping operation has been completed, the wiping operation by the wiper blade 66 is switched from the second wiping period T2 to the first wiping period T1 to perform the wiping operation.

However, the present invention is not limited to the above configuration, and, for example, configuration may be made such that in cases in which the washer switch 94 is switched ON when the vehicle speed is the specific value or greater, the wiping operation is performed at the second wiping period T2 for M cycles (2>M>N) before switching the wiping operation by the wiper blade 66 from the second wiping period T2 to the first wiping period T1 to perform the remainder of the wiping operation.

The present invention may also, for example, be configured such that in cases in which the washer switch 94 is switched ON when the vehicle speed is the specific value or greater, the wiping operation by the wiper blade 66 starts at the second wiping period T2, after which the wiping operation by the wiper blade 66 is switched from the second wiping period T2 to the first wiping period T1 at a timing when a specific duration has elapsed since starting the wiping operation by the wiper blade 66.

The present invention may also, for example, be configured such that the wiping operation by the wiper blade 66 starts at the second wiping period T2, after which the wiping operation by the wiper blade 66 is switched from the second wiping period T2 to a wiping period, other than the first wiping period T1, that is shorter than the second wiping period T2.

Explanation has been given regarding a configuration in which the wiping period of the wiper blade 66 is switched between two levels for the first cycle of the wiping operation, depending on whether or not the vehicle speed is the specific value or greater; however the present invention is not limited to such a configuration. For example, the wiping periods of the wiper blade 66 may be split into three or more plural levels, with the wiping period of the wiper blade 66 being switched in stages according to changes in the vehicle speed. Alternatively, the wiping periods of the wiper blade 66 may be switched continuously according to changes in the vehicle speed.

Regarding the attachment positions and number of the nozzles 68 on the wiper arm 64, in the above explanation, a first nozzle is attached to the wiper arm 64 to squirt washer fluid toward a wiping direction upstream side during a wiping motion of the wiper blade 66 in a direction toward the upper side return position, and a second nozzle is attached to the wiper arm 64 to squirt washer fluid toward a wiping direction upstream side during a wiping motion of the wiper blade 66 in a direction toward the lower side return position. However, the present disclosure is not limited to a configuration in which the nozzles 68 are attached to the wiper arm 64, and the present disclosure may be applied to a configuration in which fixed nozzles are disposed so as to squirt washer fluid toward fixed positions on the glass face of the windshield.

Explanation has been given regarding an exemplary embodiment of the present disclosure; however the present disclosure is not limited by the above, and various modifications may be implemented within a range not departing from the spirit of the present disclosure.

Second Exemplary Embodiment

Explanation follows regarding a wiper motor of a second exemplary embodiment of the present disclosure, with reference to FIG. 1, FIG. 8, FIG. 9, FIG. 4, and FIG. 10. The wiper motor of the second exemplary embodiment of the present disclosure may be applied to the wiper device according to the first exemplary embodiment of the present disclosure.

Figure 8:
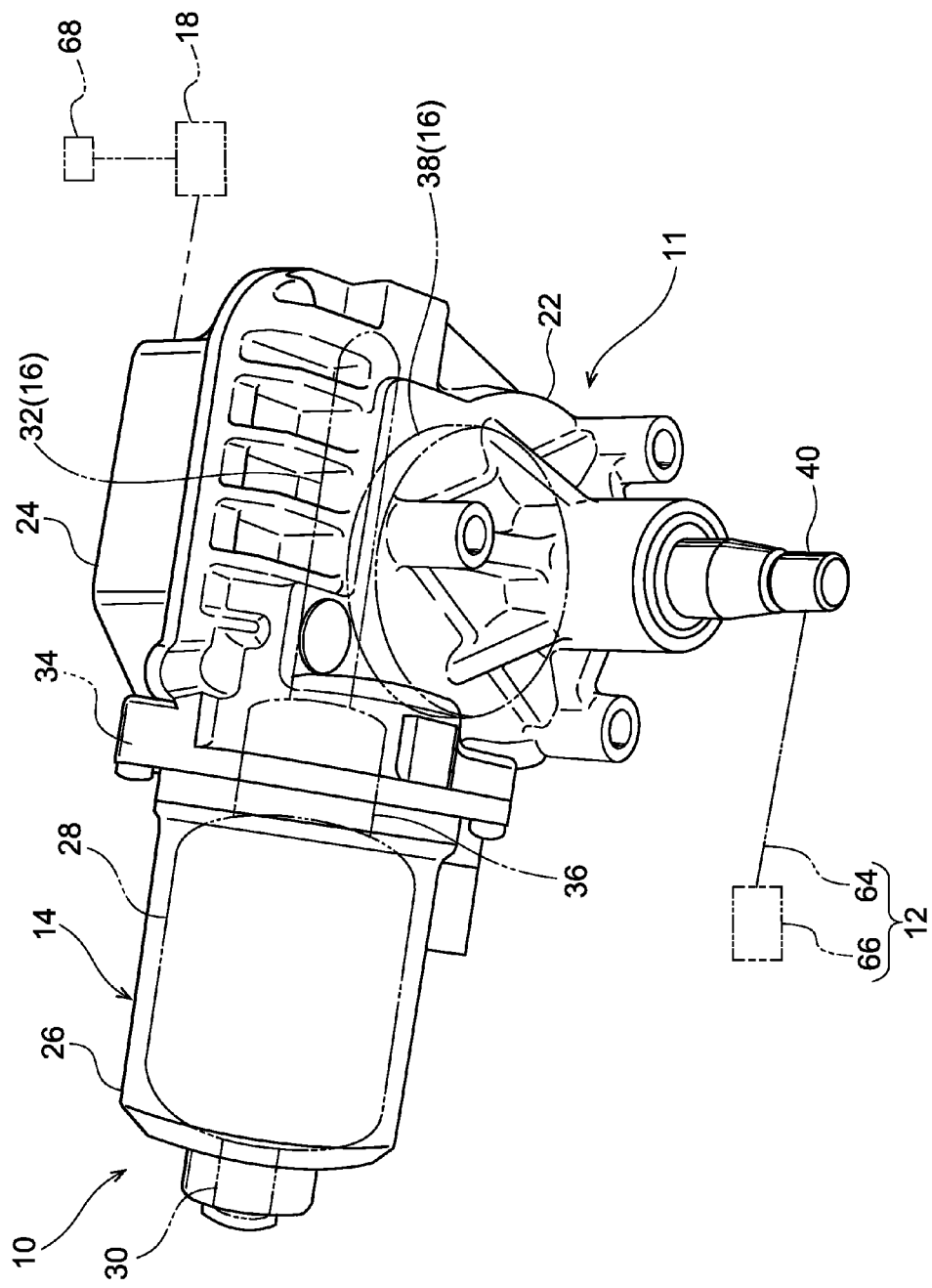
FIG. 8 is a perspective view illustrating a wiper motor as viewed from the side of an output shaft.

As illustrated in FIG. 1 and FIG. 8, a wiper motor 10 of the present exemplary embodiment is employed as a drive source of a wiper device 12 for a vehicle (car). The wiper motor 10 is configured including a motor body 14 capable of forward and reverse rotation, a speed reduction unit 11 that is coupled to the motor body 14 and reduces the speed of rotation of the motor body 14, and a controller 20 that controls drive of the motor body 14 and a washer pump 18. The speed reduction unit 11 includes a speed reduction section 16, housing 22 that houses the speed reduction section 16, and a cover 24 attached to the housing 22.

The motor body 14 is configured by a brushed DC motor. The motor body 14 includes a motor yoke 26 in a bottomed, substantially circular cylinder shape. Four permanent magnets are fixed to an inner peripheral face of the motor yoke 26, and the permanent magnets configure a four-pole motor with their magnetic poles disposed alternately to each other around the circumferential direction of the motor yoke 26. As illustrated in FIG. 8, an armature 28 that is capable of rotating freely is housed to the inside of the permanent magnets in the motor yoke 26. The armature 28 is configured including a rotation shaft 30, and the rotation shaft 30 is formed in a substantially circular rod shape, disposed coaxially to the motor yoke 26. One axial direction end portion of the rotation shaft 30 is rotatably supported by a bottom portion of the motor yoke 26 through a shaft bearing. Another axial direction end portion of the rotation shaft 30 is disposed inside the housing 22, described later, and is rotatably supported by the housing 22. A portion on the other axial direction end side of the rotation shaft 30 is integrally formed with a worm 32 configuring part of the speed reduction section 16. As illustrated in FIG. 1, the motor body 14 includes a brush holder device 34. The brush holder device 34 is disposed at a radial direction outside of a commutator 36 (see FIG. 2) provided to the armature 28, and is formed in a substantially annular shape. The brush holder device 34 is provided with plural brushes that contact the commutator 36 of the armature 28 so as to be capable of brushing against the commutator 36.

As illustrated in FIG. 2, the speed reduction section 16 is housed inside the housing 22, and is configured including the worm 32, mentioned above, and a worm wheel 38. The worm wheel 38 is formed in a substantially circular plate shape, and is fixed to an end portion on one axial direction end side of an output shaft 40. An outer circumferential portion of the worm wheel 38 enmeshes with the worm 32 previously mentioned, and the rotation of the rotation shaft 30 is reduced in speed by a specific speed reduction ratio and transmitted to the output shaft 40 to be output at a reduced speed. Rotation (the absolute angle position) of the output shaft 40 is detected by a magnetoresistive device 63 (see FIG. 4) attached to a circuit board 54 so as to face an axial end of the output shaft 40.

Figure 9:
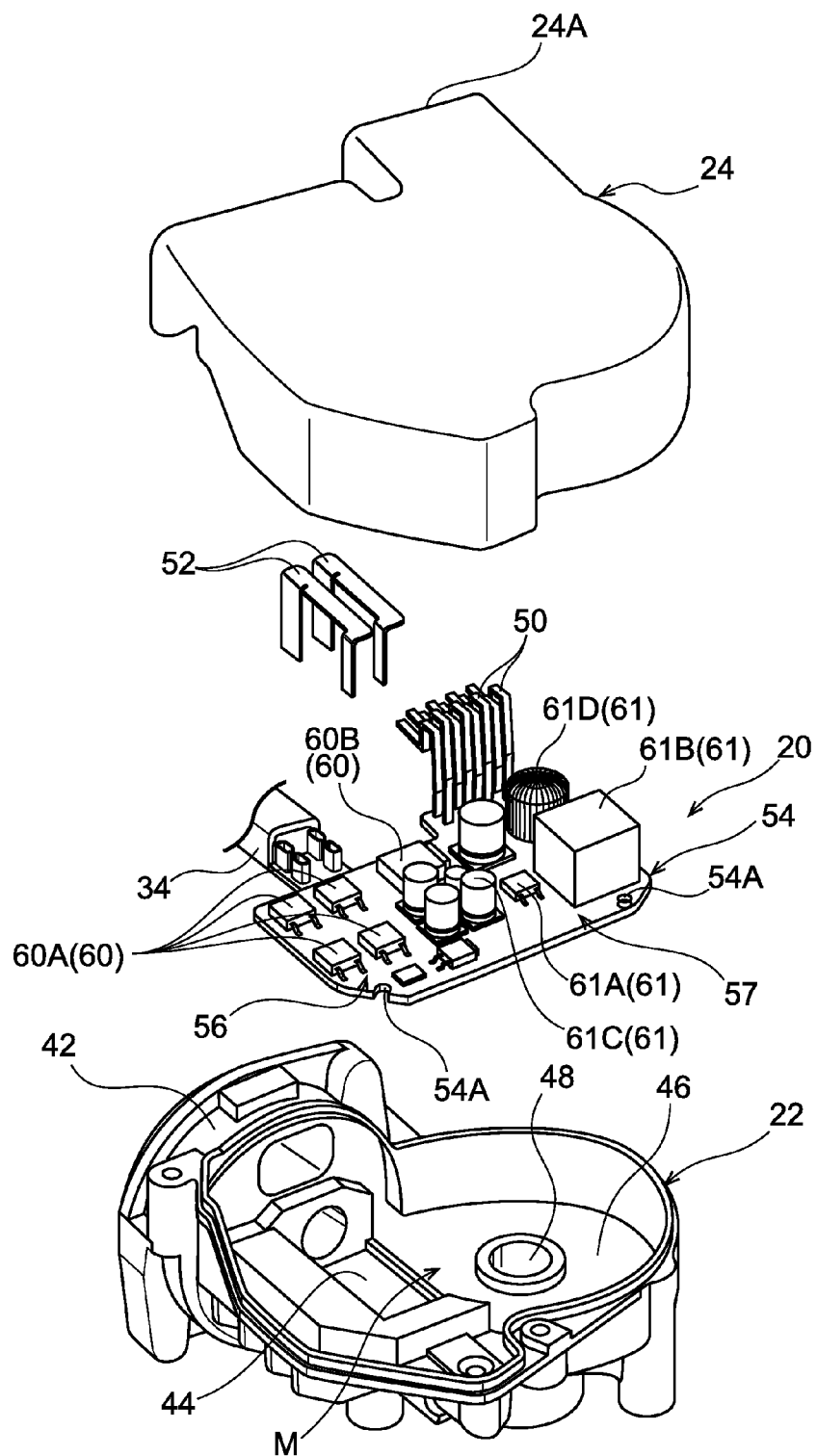
FIG. 9 is an exploded perspective view illustrating housing, a controller, a cover, etc. in a wiper motor.

As illustrated in FIG. 9, the housing 22 is formed in a substantially box shape, is disposed on the other axial direction side of the rotation shaft 30 (on the side of the opening of the motor yoke 26) to the motor yoke 26 (see FIG. 8), and is coupled to the motor body 14 by screws or the like. More specifically, the housing 22 is manufactured from aluminum (or an aluminum alloy) by die casting or the like, and is formed substantially in a box shape, open toward the opposite side to the projection direction of the output shaft 40. The housing 22 is integrally formed with a holder housing portion 42 for housing and supporting the brush holder device 34 of the motor body 14 mentioned above. The housing 22 is also formed with a worm housing portion 44, serving as a "worm placement portion", for housing the worm 32, and a worm wheel housing portion 46, serving as a "wheel placement portion", for housing the worm wheel 38. A support hole 48 through which the output shaft 40 is inserted, and that axially supports the output shaft 40, is formed at a central portion of the worm wheel housing portion 46.

The cover 24 is manufactured by, for example, injection molding an insulating resin material, and is formed in a substantially box shape open toward the side of the housing 22. The cover 24 is insert molded with external connection terminals 50. The external connection terminals 50 are electrically connected to a wiper drive circuit 56, a pump drive circuit 57, and a wiper/washer control circuit 58 (see FIG. 4) on a circuit board, described later. More specifically, the external connection terminals 50 that are connected to external connectors for input and output of electrical signals, and power supply, for a vehicle speed sensor, a rain sensor and the like are insert molded at a location corresponding to the worm wheel housing portion 46 in an attached state of the cover 24 to the housing 22. The cover 24 is insert molded with motor power supply terminals (connection terminals) 52 that connect the wiper drive circuit 56 to the brushes of the brush holder device 34. Namely, the external connection terminals 50 and the motor power supply terminals 52 are integrated to the cover 24. The external connection terminals 50 and the motor power supply terminals 52 insert molded to the cover 24 are soldered to the circuit board 54, described in detail later, and the circuit board 54 is fixed to an inside face of the cover 24 by inserting screws through insertion holes 54A in the circuit board 54 and screwing them into the cover 24. The cover 24, to which the circuit board 54 is fixed, is attached to the housing 22 so as to dispose the circuit board 54 in a sealed space M formed between the cover 24 and the housing 22, with the circuit board 54 spanning between the worm housing portion 44 and the worm wheel housing portion 46. The speed reduction mechanism 16 mentioned above (the worm 32 and the worm wheel 38) is also disposed inside the sealed space M. The cover 24 is formed with a connector portion 24A, to which the external connectors are connected.

As illustrated in FIG. 4, the controller 20 is configured by attaching to the circuit board 54 plural circuit devices 60, 61, 62 respectively configuring the wiper drive circuit 56 that drives the wiper device 12 (see FIG. 8) attached to the output shaft 40 by driving the motor body 14, the pump drive circuit 57 that drives the washer pump 18 (see FIG. 8), and the wiper/washer control circuit 58 that controls the wiper drive circuit 56 and the pump drive circuit 57.

As described above, the circuit board 54 is disposed spanning between the worm housing portion 44 and the worm wheel housing portion 46 of the housing 22 by closing off the opening of the housing 22 with the cover 24, with the circuit board 54 fixed to the inside face of the cover 24. When this is performed, the circuit board 54 is disposed at a separation to one axial direction side end of the output shaft 40. The circuit board 54 is formed in a rectangular plate shape extending with its thickness direction along the axial direction of the output shaft 40.

When the circuit board 54 is viewed along the axial direction of the output shaft 40 in the attached state of the cover 24 to the housing 22 (namely, as viewed from the open side of the housing 22), a location on the circuit board 54 corresponding to the worm wheel housing portion 46 is electrically connected to one end of the plural external connection terminals 50 insert molded to the cover 24 (the other end being connected to external connectors).

Moreover, when the circuit board 54 is viewed along the axial direction of the output shaft 40 in the attached state of the cover 24 to the housing 22, a location of the circuit board 54 corresponding to the worm wheel housing portion 46 is mounted with plural of the circuit devices 61 clustered in the vicinity of (close to) the plural external connection terminals 50 (connector portion 24A). The circuit devices 61 and a conductive pattern formed to the circuit board 54 configure the circuit of the pump drive circuit 57. Note that the circuit devices 61 include Field Effect Transistors (referred to below as FETs) 61A, a relay box 61B, an electrolytic capacitor 61C, and a choke coil 61D. In the present exemplary embodiment, two relays are provided inside the relay box, thus enabling forward and reverse rotation of the motor 70 of the washer pump 18 (see FIG. 10).

When the circuit board 54 is viewed along the axial direction of the output shaft 40 in the attached state of the cover 24 to the housing 22, the plural circuit devices 60 are mounted to a location of the circuit board 54 on the worm housing portion 44 side of the pump drive circuit 57, more specifically, on the circuit board 54 at both sides of the worm 32 on the worm housing portion 44 side of the pump drive circuit 57. The circuit devices 60 and a conductive pattern formed to the circuit board 54 configure the circuit of the wiper drive circuit 56. Note that the circuit devices 60 include plural FETs 60A, serving as "switching elements" with H bridge connections, and a pre-driver 60B.

When the circuit board 54 is viewed along the axial direction of the output shaft 40, the circuit device 62 configuring the wiper/washer control circuit 58 is attached to a face of the circuit board 54 on the opposite side to the face on which the circuit devices 60, 61 are attached, positioned at a boundary position between the wiper drive circuit 56 and the pump drive circuit 57 (positioned between the worm 32 and the output shaft 40 in FIG. 4). The circuit device 62 is configured by a microcomputer 62.

The plural external connection terminals 50 are electrically connected to the wiper drive circuit 56, the pump drive circuit 57, and the wiper/washer control circuit 58. As viewed along the axial direction of the output shaft 40, the plural external connection terminals 50 are joined to the circuit board 54 at a location corresponding to the worm wheel housing portion 46 on the opposite side of the output shaft 40 to the worm housing portion 44, and in a state disposed on the motor body 14 side in the axial direction of the rotation shaft 30.

As viewed along the axial direction of the output shaft 40, the plural FETs 60A that switch the motor body 14 using PWM control, and that configure part of the wiper drive circuit 56, are disposed on the worm housing portion 44 side of the output shaft 40, in the vicinity of the motor power supply terminals 52.

Figure 10:
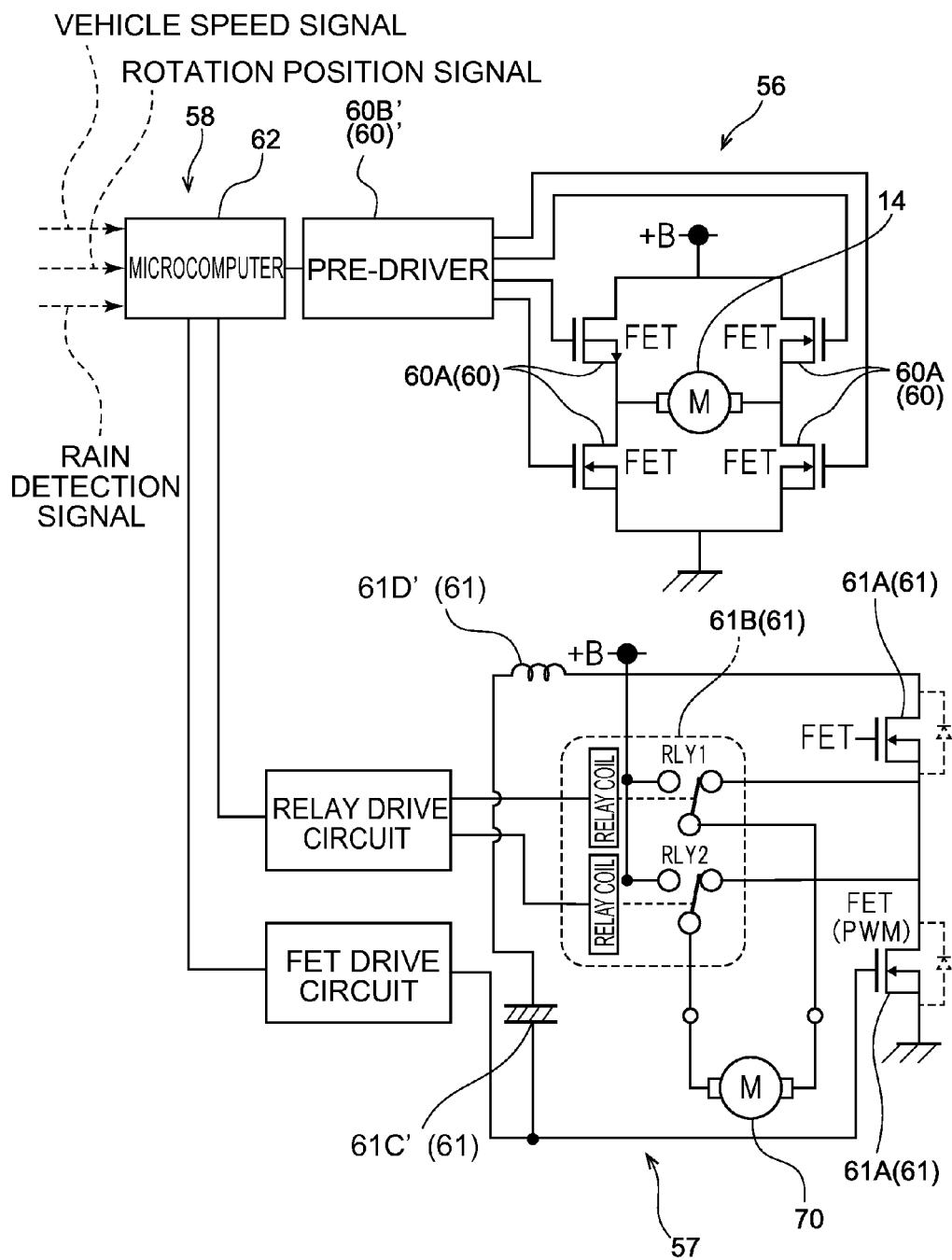
FIG. 10 is a circuit diagram schematically illustrating circuits of a controller.

FIG. 10 is a circuit diagram schematically illustrating circuits of the controller 20. As illustrated in FIG. 10, the pump drive circuit 57 is configured independently of the wiper drive circuit 56. The pump drive circuit 57 and the wiper drive circuit 56 are controlled based on commands from the single wiper/washer control circuit 58, namely are controlled based on commands from the single microcomputer 62. The microcomputer 62 is input with signals for the rotation position (absolute angle position) of the output shaft 40 detected by the magnetoresistive device 63, and with vehicle speed signals and rain sensor detection signals input through the external connection terminals 50.

Operation and Advantageous Effects of the Present Exemplary Embodiment

Next, explanation follows regarding operation and advantageous effects of the present exemplary embodiment.

As illustrated in FIG. 1 and FIG. 8, in the present exemplary embodiment, when the wiper drive circuit 56 is operated by a command from the wiper/washer control circuit 58, the motor body 14 is driven and the rotation shaft 30 rotates together with the worm 32. The rotation of the rotation shaft 30 is reduced in speed by the worm 32 and the worm wheel 38 and transmitted to the output shaft 40 for output. The motor body 14 is driven forward and in reverse, such that the output shaft 40 rotates back and forth over a range of less than 360°, based on rotation angle signals from the magnetoresistive device 63 that detects the rotation angle (absolute angle position) of the output shaft 40. This accordingly drives the wiper device 12 attached to the output shaft 40. Namely, a wiper arm 64 attached to the output shaft 40 swings back and forth, and a wiper blade 66 attached to a leading end portion of the wiper arm 64 wipes the vehicle windshield.

The motor 70 (see FIG. 10) of the washer pump 18 is driven when the pump drive circuit 57 is operated by a command from the wiper/washer control circuit 58. Cleaning fluid (washer fluid) is accordingly squirted toward the windshield from nozzles 68 connected to the washer pump 18. In the vehicle provided with the wiper motor 10 of the present exemplary embodiment, when the driver operates a washer switch to command operation of the washer pump 18, the wiper/washer control circuit 58 issues a drive command to the pump drive circuit 57 and the wiper drive circuit 56, and cleaning fluid is squirted toward the windshield, coordinated with which the wiper motor 10 is operated so as to wipe the windshield with the wiper blade 66.

As illustrated in FIG. 4, in the present exemplary embodiment, the pump drive circuit 57 and the external connection terminals 50 are disposed on the circuit board 54 so as to correspond to the worm wheel housing portion 46 of the housing 22, and the wiper drive circuit 56 is disposed on the circuit board 54 at the worm housing portion 44 side of the pump drive circuit 57. Such a layout shortens the distance between the external connection terminals 50, to which the external connectors are connected, and the pump drive circuit 57 that drives the washer pump 18, thereby enabling wiring electrically connecting the two together to be made shorter. Namely, on the circuit board 54, the pump drive circuit 57 is disposed clustered together with the external connection terminals 50 to which the external connectors are connected, so as to correspond to the worm wheel housing portion 46, thereby shortening wires between the pump drive circuit 57, which is not related to drive and control of the motor body 14 that drives the wiper device 12, and the external connection terminals 50. This thereby enables a reduction in noise emission from the wiper motor 10. The wiper drive circuit 56 is disposed on the worm housing portion 44 side of the pump drive circuit 57, so as to be disposed closer to the motor body 14 than the placement area of the pump drive circuit 57, such that wiring between the wiper drive circuit 56 and the motor body 14, this being wiring that switches to carry a relatively large drive current to the motor body 14, can be made shorter. This thereby enables a reduction in electromagnetic noise emission from the wiper motor 10.

In the present exemplary embodiment, the external connection terminals 50 that are electrically connected through wiring to the wiper drive circuit 56, the pump drive circuit 57, and the wiper/washer control circuit 58 are disposed on the opposite side of the output shaft 40 to the worm housing portion 44, thereby enabling input to the side of the pump drive circuit 57 and the external connection terminals 50 to be suppressed.

In the present exemplary embodiment, the wiper drive circuit 56, the pump drive circuit 57, and the wiper/washer control circuit 58, namely the circuit devices 60, 61, 62 configuring the respective circuits, are attached to the single circuit board 54, such that the wiper/washer control circuit 58 controls both the wiper drive circuit 56 and the pump drive circuit 57, enabling wiring connecting them together to be formed with a simple layout. Namely, the wiring on the circuit board 54 can be simplified and reduced in length. This thereby enables a further reduction in noise emission from the wiring on the circuit board 54.

In the present exemplary embodiment, the FETs 60A, serving as "switching elements" that configure part of the wiper drive circuit 56 and switch the motor body 14 using PWM control, are disposed on the worm housing portion 44 side of the output shaft 40, thereby enabling the transmission of heat from the FETs 60A to the pump drive circuit 57 to be suppressed.

In the present exemplary embodiment, the pump drive circuit 57 and the wiper drive circuit 56 are controlled based on commands from the single microcomputer 62, thereby enabling, for example, wiring for electrical signals such as sensor signals to be simplified, and enabling a reduction in size of the circuit board in comparison to cases in which a microcomputer for controlling the pump drive circuit 57 and a microcomputer for controlling the wiper drive circuit 56 are provided separately to each other on the circuit board 54. The single microcomputer 62 is moreover disposed on the face of the circuit board 54 on the opposite side (the face on the housing 22 side) to the face of the circuit board 54 on the side disposed with the pump drive circuit 57 and the wiper drive circuit 56 (the face on the cover 24 side).

In the present exemplary embodiment, explanation has been given regarding a preferable example in which the circuit board 54 is disposed in the sealed space M formed between the housing 22 and the cover 24. However, the present invention is not limited thereto. For example, the cover 24 may be partially open. Whether or not to dispose the circuit board 54 inside the sealed space M may be decided as appropriate in consideration of the amount of heat emission from the circuit devices 60, 62, the water resistance of the wiper motor 10, and so on.

In the present exemplary embodiment, explanation has been given regarding a preferable example in which the circuit devices 60, 61, 62 are attached to the single circuit board 54; however the present invention is not limited thereto. For example, the circuit devices 60, 61, 62 may be attached to plural respective circuit boards, and the plural circuit boards may be connected together through wiring to configure a controller corresponding to the controller 20 described above.

In the present exemplary embodiment, explanation has been given regarding a preferable example in which the pump drive circuit 57 and the wiper drive circuit 56 are controlled based on commands from the single microcomputer 62; however the present invention is not limited thereto. For example, configuration may be made in which a microcomputer for controlling the pump drive circuit 57, and a microcomputer for controlling the wiper drive circuit 56, are provided separately to each other on the circuit board 54.

Explanation has been given regarding exemplary embodiments of the present invention. However, the present invention is not limited by the above, and various other modifications may be implemented within a range not departing from the spirit of the present invention.

What is claimed is:
1. A wiper device comprising:
   a wiper motor that uses a wiper to perform a wiping operation between first and second return positions on a wiped surface; and
   a controller that controls the wiper motor such that a wiping operation by the wiper is performed during a first wiping period for a plurality of cycles in a case in which a vehicle speed detected by a vehicle speed detection section is below a specific speed and a washer switch is switched ON to instruct a washer pump to eject washer fluid, and controls the wiper motor such that a wiping operation of a plurality of cycles by the wiper begins by starting during a second wiping period that is longer than the first wiping period in a case in which the vehicle speed detected by the vehicle speed detection section is the specific speed or greater and the washer switch is switched ON.

2. The wiper device of claim 1, wherein:
the controller controls the wiper motor such that the wiping operation by the wiper during the second wiping period is performed either for a first timespan until a specific duration has elapsed after the washer switch is switched ON, or for a second timespan after the washer switch being switched ON until a specific number of cycles of the wiping operation have been completed out of the plurality of cycles of the wiping operation.

3. The wiper device of claim 1, wherein:
the controller controls the wiper motor such that the wiping operation by the wiper during the second wiping period is performed for a third timespan after the washer switch is switched ON until the initial cycle of the wiping operation has been completed out of the plurality of cycles of the wiping operation.

4. The wiper device of claim 3, wherein:
the washer pump is operated only while the washer switch is switched ON in a case in which the washer switch is switched ON for a shorter time than the initial cycle of the wiping operation by the wiper at the second wiping period.

5. The wiper device of claim 3, wherein:
the washer pump is operated continuously, except while the wiper is within a specific distance of either the first or the second return position, in a case in which the washer switch is still switched ON after the initial cycle of the wiping operation by the wiper during the second wiping period has been completed.

6. The wiper device of claim 2, wherein:
the controller controls the wiper motor such that, among the respective timespans over which the wiping operation of the plurality of cycles is performed by the wiper, the wiping operation by the wiper is performed at a shorter wiping period than the second wiping period during a timespan that does not fall under any out of the first timespan to the third timespan.

7. The wiper device of claim 1, wherein:
the controller begins driving of the wiper motor after a specific time delay has elapsed after the washer switch is switched ON.

8. The wiper device of claim 1, wherein:
the controller ejects washer fluid by driving the washer pump when the washer switch is switched ON.

9. The wiper device of claim 1, wherein the wiper motor includes:
a motor body including a rotation shaft that rotates about an axial line and includes a worm;
a housing that includes a worm placement portion in which the worm is disposed and a wheel placement portion in which a worm wheel enmeshed with the worm is disposed, and that is coupled to the motor body;
a speed reduction section that reduces a speed of rotation of the rotation shaft for output from an output shaft; and
a circuit board that is housed between the housing of the speed reduction section and a cover closing off an opening in the housing,
wherein the circuit board includes:
a wiper drive circuit that drives the motor body to drive the wiper device attached to the output shaft,
a pump drive circuit that drives the washer pump,
a wiper/washer control circuit that controls the wiper drive circuit and the pump drive circuit, and
an external connection terminal that is input with, or outputs, at least one out of a power source connected to the external connection terminal, or an electrical signal, and that is electrically connected with the respective circuits through wiring, and wherein:
the pump drive circuit and the external connection terminal are disposed at positions on the circuit board corresponding to the wheel placement portion, and
the wiper drive circuit is disposed on the circuit board at a worm placement portion side of the pump drive circuit.

10. The wiper device of claim 9, wherein:
the external connection terminal is disposed on an opposite side of the output shaft from the worm placement portion.

11. The wiper device of claim 9, wherein:
the wiper drive circuit, the pump drive circuit, and the wiper/washer control circuit are provided on a single circuit board.

12. The wiper device of claim 9, wherein:
the wiper drive circuit includes a switching element that switches the motor body using PWM control; and
the switching element is disposed at the worm placement portion side of the output shaft.

13. The wiper device of claim 9, wherein:
the pump drive circuit is configured independently of the wiper drive circuit; and
the pump drive circuit and the wiper drive circuit are controlled based on commands from the single wiper/washer control circuit.

14. A wiper motor comprising:
a motor body including a rotation shaft that rotates about an axial line and includes a worm;
a housing that includes a worm placement portion in which the worm is disposed and a wheel placement portion in which a worm wheel enmeshed with the worm is disposed, and that is coupled to the motor body;
a speed reduction section that reduces a speed of rotation of the rotation shaft for output from an output shaft; and
a circuit board that is housed between the housing of the speed reduction section and a cover closing off an opening in the housing,
wherein the circuit board includes:
a wiper drive circuit that drives the motor body to drive a wiper device attached to the output shaft,
a pump drive circuit that drives a washer pump,
a wiper/washer control circuit that controls the wiper drive circuit and the pump drive circuit, and
an external connection terminal that is input with, or outputs, at least one out of a power source connected to the external connection terminal, or an electrical signal, and that is electrically connected with the respective circuits through wiring, and wherein:
the pump drive circuit and the external connection terminal are disposed at positions on the circuit board corresponding to the wheel placement portion, and
the wiper drive circuit is disposed on the circuit board at a worm placement portion side of the pump drive circuit.

15. The wiper motor of claim 14, wherein:
the external connection terminal is disposed on an opposite side of the output shaft from the worm placement portion.

16. The wiper motor of claim 14, wherein:
the wiper drive circuit, the pump drive circuit, and the wiper/washer control circuit are provided on a single circuit board.

17. The wiper motor of claim 14, wherein:
the wiper drive circuit includes a switching element that switches the motor body using PWM control; and
the switching element is disposed at the worm placement portion side of the output shaft.

18. The wiper motor of claim 14, wherein:
the pump drive circuit is configured independently of the wiper drive circuit; and
the pump drive circuit and the wiper drive circuit are controlled based on commands from the single wiper/washer control circuit.

* * * * *